United States Patent [19]
Michellone et al.

[11] 3,753,598
[45] Aug. 21, 1973

[54] HYDRAULIC ANTISKID VEHICLE BRAKING SYSTEM, HAVING TWO MODES OF OPERATION

[75] Inventors: Giancarlo Michellone, Cambiano; Luigi Doano, Revigliasco d'Asti; Marco Peruglia, Turin; Diamante De Ambri, Beinasco, all of Italy

[73] Assignee: FIAT Societa per Azioni, Turin, Italy

[22] Filed: July 27, 1971

[21] Appl. No.: 166,533

[30] Foreign Application Priority Data
Mar. 5, 1971   Italy ............................. 67775 A/71
Apr. 6, 1971   Italy ............................. 68143 A/71

[52] U.S. Cl. ........................... 303/21 F, 137/505.22
[51] Int. Cl. ............................................... B60t 8/12
[58] Field of Search ............................ 137/505.22; 303/21 F, 61-63, 68-69, 10; 188/181

[56]   References Cited
   UNITED STATES PATENTS
2,273,535   2/1942   Peo ............................. 137/505.22
2,955,614   10/1960   Meynig ......................... 137/505.22
3,517,681   6/1970   Davison ........................ 137/505.22
3,667,816   6/1972   Harned .......................... 303/21 F

*Primary Examiner*—Duane A. Reger
*Attorney*—Richard C. Sughrue, Robert V. Sloan et al.

[57] ABSTRACT

An hydraulic anti-skid braking system for vehicles, having two different modes of operation depending on the braking pressure required to cause the wheels to slip or for wheel locking to become imminent. If the surface is slippery the braking pressure required to cause sliding is not high and a rapid, substantially complete release of braking pressure takes place when the anti-skid device operates. If the surface has a good grip a high braking pressure is required to cause the wheels to slip and in this case a partial rapid release of pressure followed by a gradual release of pressure takes place when the antiskid device operates, to prevent excessive lurching during operation of the anti-skid device and to assist in a satisfactory anti-skid operation despite changing surface conditions.

5 Claims, 6 Drawing Figures

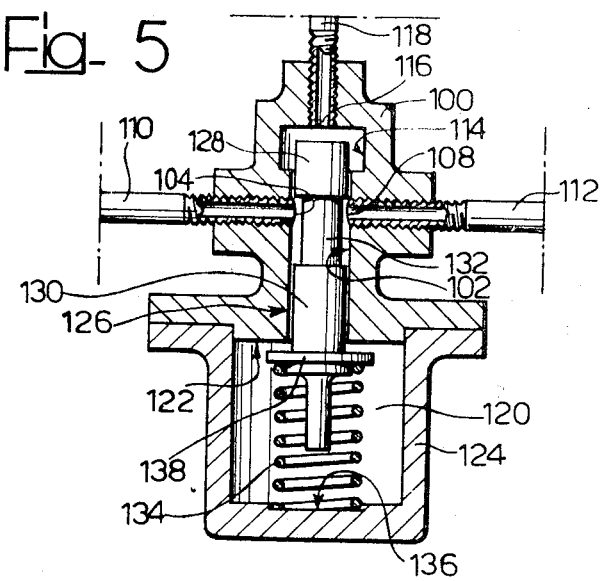
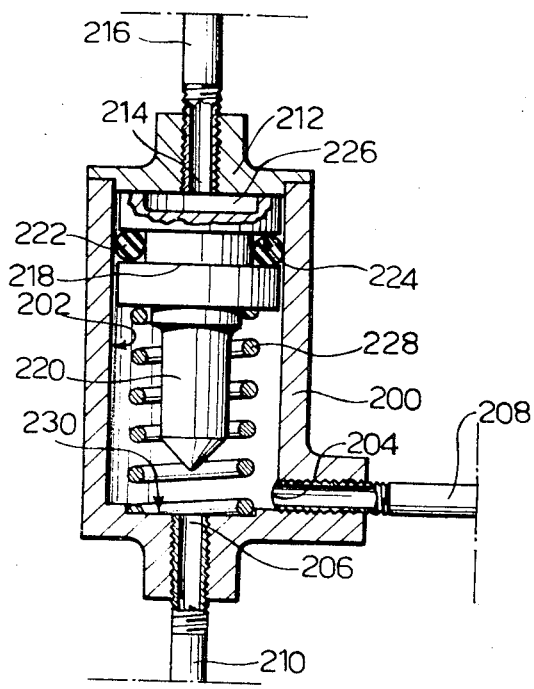

HYDRAULIC ANTISKID VEHICLE BRAKING SYSTEM, HAVING TWO MODES OF OPERATION

BACKGROUND OF THE INVENTION

The present invention relates to an hydraulic anti-skid vehicle braking device which has different braking response characteristics when in the anti-skid mode, depending on the type surface on which the vehicle is moving at the time.

A fundamental problem in anti-skid braking systems is due to the difficulty in achieving satisfactory response of the braking system on different types of surface. In particular, a response which is satisfactory on substantially dry surfaces on which the wheels of the vehicle can obtain a good grip, is often unsuitable for very slippery surfaces such as icy, or muddy roads. Conversely, a response which is suitable for slippery surfaces is not suitable for substantially dry good holding surfaces.

In fact the braking pressure which must be exerted in order to cause the wheels to slip and thus to excite operation of the anti-skid part of the braking system is low on slippery surfaces and hence requires a substantially complete discharge of the braking pressure to prevent the wheels from slipping, whereas on dry surfaces on which there is a good grip the braking pressure required to cause sliding is very high and thus it is preferable that the release of braking pressure should be, at least initially, only partial in order to avoid excessive shuddering on braking upon dry surfaces.

HISTORY OF THE INVENTION

In a previous patent application by the same applicant, that is Italian Patent application No. 67109-A/70 which was filed on the 15th Jan. 1970, there is described a pneumatic anti-skid braking system having two modes of operation, one suitable for braking upon a slippery surface and one for braking upon a dry surface; the selection of the particular mode of operating being automatically effected on the basis of a discrimination about a threshold value of the braking pressure which is being exerted at the time when the anti-skid device is actuated.

In a subsequent patent application by the same applicant, that is Italian Patent application No. 71335-A/70, which was filed on the 30th Dec. 1970, there is described a further improved pneumatic anti-skid braking system which is arranged to operate on much the same principle as the system described in the above mentioned application No. 67109-A/70 but with various modifications.

OBJECT OF THE INVENTION

The object of the invention is to provide an hydraulic anti-skid vehicle braking system having two modes of operation, which offers much the same advantages as are obtained by the pneumatic systems described in the said previous patent applications.

SUMMARY OF THE INVENTION

According to the present invention there is provided an anti-skid braking system for at least one wheel of a vehicle, of the type comprising a reservoir of hydraulic fluid, a source of hydraulic pressure, a pressure operated brake connectible to the hydraulic pressure source, pressure discharge means operable to release the pressure in the brake, and an anti-skid control device sensitive to the dynamic state of the wheel to actuate the pressure discharge means during braking in dependence on the dynamic state of the wheel in which the discharge means include a first discharge path from the brake, the path having a throttle valve and an associated expansion chamber, and a second discharge path, in parallel with the first path and having a pressure controlled valve the control gate of which is sensitive to the braking pressure to close the valve if the braking pressure exceeds a predetermined threshold value so that the only available path to the reservoir is the first discharge path via the throttle valve.

Further features and advantages of the invention will become apparent during the course of the following description with reference to the drawings.

BRIEF DESCRIPTION OF THE DRAWINGS

FIGS. 5 and 6 are axial sections of alternative embodiments of a pressure controlled valve suitable for use in the braking system of FIG. 1.

DESCRIPTION OF THE PREFERRED EMBODIMENTS

Figure 1:
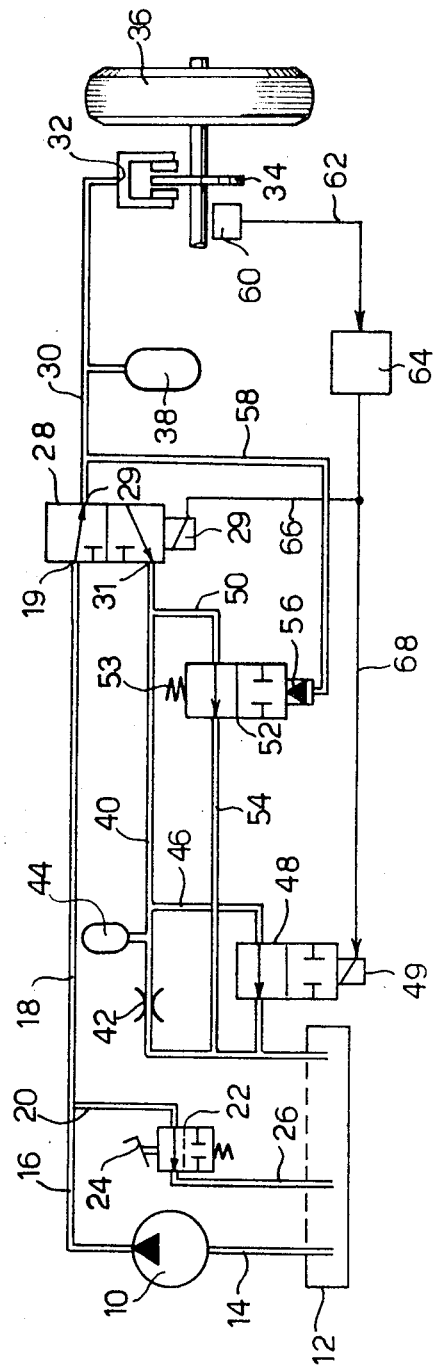
FIG. 1 is a diagrammatic illustration of one embodiment of an anti-skid braking system constructed in accordance with the present invention.

In FIG. 1 a volumetric or positive displacement hydraulic pump 10, driven, for example, by the engine of a vehicle (not illustrated) draws hydraulic fluid from a reservoir 12, via a pipe 14, and pumps it along a pipe 16, which branches into a pipe 18 and a pipe 20. The pipe 20 leads to a normally open valve 22, which can be closed progressively by means of a brake pedal 24. The outlet of the valve 22 is connected by a pipe 26 to the reservoir 12.

The pipe 18 leads to an inlet 19 of a solenoid operated valve 28; for convenience, in this specification solenoid operated valves will be termed electrovalves. The electrovalve 28 is a three port, two position valve which normally connects the pipe 18 with an outlet 29 which is connected to a pipe 30 which leads to braking calipers 32. The calipers 32, when actuated by pressure via the pipe 30 clamp onto a brake disc 34 which is carried by the axis of a wheel 36 of the vehicle to effect braking of the wheel in the known normal manner of a disc brake. Connected to the pipe 30 there is an expansion chamber 38.

The normally closed outlet 31 of the electrovalve 28 is connected to a pipe 40 which leads to the reservoir 12, via a throttle opening 42. An expansion chamber 44, of the same type as the expansion chamber 38 communicates with the pipe 40 adjacent the throttle 42. The pipe 40 has a branch 46 above the throttle 42 which leads to the reservoir 12 through a normally open electrovalve 48. A second branch 50 from the pipe 40 leads to the inlet of a normally open, pressure controlled valve 52, the outlet opening of which is connected to the reservoir 12 via a pipe 54. The valve 52 is controlled by means of a control port 56 fed through a pipe 58 by the pressure in the pipe 30.

The speed of the wheel 36 is detected by a tachometer 60, which may, for example, by a dynamo tachometer. A line 62 supplies a signal representing the velocity of the wheel from the tachometer 60 to an anti-skid control device 64, which can be of any suitable known type. For example, one very simple type of anti-skid control device, suitable for use in this system, comprises a bistable device (Schmitt trigger) which supplies an output voltage signal to a line 66 and to a line 68 when the deceleration of the wheel 36 exceeds a predetermined threshold value, indicating imminent sliding of the wheel. A voltage signal on the lines 66 and 68 thus energises the solenoids 29 and 49 of the electrovalves 28 and 48 when sliding of the wheel is imminent as determined by the control device 64 based upon the information signal from the tachometer 60.

A preferred embodiment of the anti-skid control device 64 is described in Italian Patent application No. 67085-A/70 filed by the same applicant on 13th Jan. 1970.

The valve 52 is normally kept open by a calibrated spring 53, which acts against the pressure in the control opening 56. The valve 52 closes when the pressure in the opening 56 exceeds the calibration threshold of the spring 53.

FIG. 5 is an axial section of a pressure controlled valve, suitable for use as the valve 52 of FIG. 1. The valve of FIG. 5 is preferred because of the simplicity of its construction.

With reference to FIG. 5, the valve 52 comprises a valve body 100 having a cylindrical bore 102, communicating with which there are an inlet opening 104, and an outlet opening 108 of the valve. The two openings 104 and 108 face each other across the bore 102 and are connected respectively to a pipe 110 and to a pipe 112.

At one end of the cylindrical bore 102 there is a chamber 114 having a control inlet 116, which can be connected via a pipe 118 to a source of control pressure such as the pipe 30 of FIG. 1.

At the other end of the cylindrical bore 102 there is a second chamber 120 formed by a cover 124 attached to a face 122 of the valve body 100 by suitable means, such as bolts (not illustrated).

Within the cylindrical bore 102 there is located a piston 126 which has an intermediate annular recessed portion 132 which separates the piston into two enlarged end portions 128 and 130.

A compression spring 134, is located in the chamber 120 and extends between a centering depression 136 in the end of the cover 124 and a washer 138 carried by the piston 126.

In the normal position, with no pressure at the control inlet 116, the spring 134 urges the piston 126 towards the chamber 114 so that the intermediate recessed portion 132 of the piston 126 is maintained in a position adjacent the openings 104 and 108, to provide a relatively unrestricted path through the valve between the two openings for the hydraulic fluid in the circuit.

When a control pressure is applied via the pipe 118 to the chamber 114 it exerts a force on the upper face of the piston 126. When this force is greater than the calibration threshold of the spring 134, the piston 126 moves sharply, that is in a substantially instantaneous manner towards the chamber 120 thus moving the enlarged portion 128 of the piston into line with the openings 106, 108, thereby interrupting the path between them.

One advantage of this valve is that it can be constructed without any joints in its inner structure and thus does not require stringent manufacturing tolerances. In fact, since it is to be used in a circuit in which its three ports 104, 108 and 116, are all connected to different points of a closed hydraulic circuit any small leakages of the hydraulic fluid past the enlarged portions 128, 130 of the piston 126 do lead to unacceptable consequences. The pressures at which the piston commutes from one position to another is not, in fact, critical so that even relatively large variations in this commutation pressure are not unacceptable. Moreover the structural simplicity and the absence of joints in the valve ensure a reliable operation thereof.

FIG. 6 illustrates a second type of pressure controlled valve suitable for use as the valve 52 in the circuit of FIG. 1. The valve comprises a valve casing 200 having a cylindrical bore 202, in the side wall of which there is an inlet 204 and in one end wall of which there is an outlet 206. The inlet 204 and the outlet 206 are connected to pipes 208, 210 respectively.

The cylindrical bore 202 of the valve casing 200 is closed at the end remote from the outlet 206 by a cover 212 fixed to the casing 200 by suitable fixing means such as bolts (not illustrated). The cover 212 has a control port 214 connected to a pipe 216, through which a control pressure can be applied.

A piston 218 slides in the cylindrical bore 202. The piston 218 has a plunger 220 facing the outlet opening 206 in the end of the bore 202. A sealing ring 222 is located in an annular relieved portion 224 of the piston 218. In the face of the piston 218 facing the control port 214 there is a chamber 226.

In the cylindrical bore 202, and surrounding the plunger 220 there is a threshold spring 228 which extends between the lower face of the piston 218 and a centering depression 230 in the end of the bore 202 in which the outlet 206 is formed.

In normal conditions when there is little or no pressure in the control port the spring 228 urges the piston 218, toward the end of the bore 202 in which the control port is formed, thereby holding the plunger 220 away from the outlet 206 and allowing the free flow of hydraulic fluid from the inlet 204 through the valve to the outlet 206. By applying a control pressure through the pipe 216 and the opening 212 to the chamber 214 such as to exert a force upon the piston 218 which is greater than the calibration threshold of the spring 228, the piston 218 is moved sharply to a position where the plunger 220 closes the outlet 206, thereby interrupting any fluid flow through the valve between the inlet 204 and the outlet 206.

As discussed for the valve of FIG. 5, slight leakages of hydraulic fluid past the piston 218 are acceptable and the constructional simplicity of the valve ensures its rapid and reliable operation so that it is eminently suitable for use as the valve 52 of FIG. 1.

Figure 2:
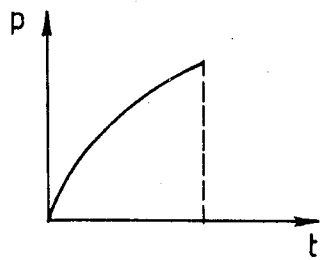
FIG. 2 is a diagram illustrating the variation of braking pressure with respect to time, when there is no anti-skid action.

The circuit of FIG. 1 with either the valve of FIG. 5 or the valve of FIG. 6, operates as follows:

Under normal running conditions, that is when the brakes are not applied, the hydraulic fluid pumped by the volumetric or positive displacement pump 10 discharges into the reservoir 12 through the pipe 20, the valve 22 and the pipe 26. When the brakes are applied by pressure upon the pedal 24 the valve 22 progressively restricts the flow of fluid, depending on the pressure on the brake pedal, thereby increasing the pressure in the pipe 16 by an amount which is proportional to the amount of restriction, that is, to the amount by which the brake pedal 24 is depressed. Since the electrovalve 28 is normally open the pressure in the pipe 16 is applied to the brake calipers 32 via the pipe 18, the electrovalve 28, and the pipe 30 thereby braking the wheel 36. The hydraulic fluid is also directed to the expansion chamber 38 into which it flows. Due to the capacity of the expansion chamber 38 the pressure on the brake calipers 32 increases gradually as shown by the continuous curve of FIG. 2.

The pressure in the pipe 30 is also applied to the control port 56 of the valve 52 by means of the pipe 58, and if the braking pressure exceeds a predetermined threshold pressure $P_S$ whereby the force of the calibrated spring 53 is overcome, as described in relation to FIGS. 5 and 6, the valve 52 closes.

When the brake pedal 24 is released, the pressure in the pipe 30 discharges immediately through the valve 28, the pipe 18, the pipe 20, the valve 22 and the pipe 26 to the reservoir 12 and the expansion chamber 38 discharges similarly. This has no effect, however, if the anti-skid control device 64 does not operate and the braking continues normally.

Considering the case when, before the pedal 24 is released, the wheel 36 is subjected to excessive deceleration, such as to bring it into a state where sliding or locking is imminent and, for example, assuming this occurs whilst the vehicle is moving on a slippery surface of low grip such as an icy road, so that the pressure in the pipe 30 and hence also in the pipe 58 and in the control port 56 of the valve 52 is less than the threshold pressure $P_S$ of the valve 52, so that the valve 52 remains open. The incipient locking conditon of the wheel 36 is detected by the anti-skid control device 64, which energises the solenoids 29 and 49 of the electro valves 28 and 48 respectively, thus connecting the pipe 30 to the pipe 40, and closing the valve 48. The pressure in the pipe 40 can discharge into the reservoir 12 through the pipe 50 which branches from the pipe 40, via the open valve 52 and the pipe 54. Although there is a discharge route through the throttle 42 and the line 40, this is negligible in view of the greater resistance offered by the throttle 42 in comparison with the relatively unrestricted flow path through the valve 52.

Figure 3:
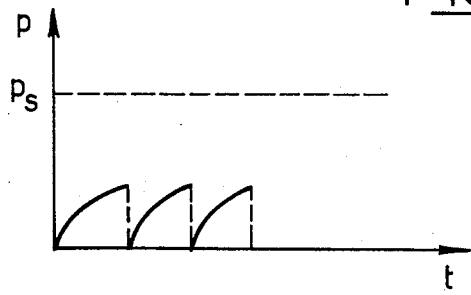
FIG. 3 is a diagram illustrating the variation of braking pressure with respect to time, in a first mode of operation of the anti-skid part of the braking system of FIG. 1.

As soon as the wheel 36 is no longer in an incipient locking state, the anti-skid control device 64 de-energises the solenoids 29 and 49, returning the circuit to its initial condition and allowing the re-application of pressure from the pipe 18 to the pipe 30 and hence to the brake calipers 32 so that the deceleration of the wheel 36 recommences. The variation of the braking pressure applied to the brake calipers 32 is therefore approximately as shown in FIG. 3, with successive applications of the brakes and the braking pressure never exceeding the threshold pressure $P_S$ to which the valve 52 is set to respond.

Now considering the case where the wheel 36 undergoes excessive deceleration during braking, such as to cause an incipient locking condition when the vehicle is moving upon a surface with good grip such as, for example, upon a well surfaced dry road. In this case the braking pressure applied to the brake calipers 32 will have risen above the calibration threshold $P_s$ of the valve 52 before the anti-skid control device 64 operates so that the pressure communicated to the control port 56 through the pipe 58 will have closed the valve 52.

As before, the anti-skid control device 64, detects the incipient locking condition and energises the solenoids 29 and 49 of the valves 28 and 48 respectively through the lines 66 and 68. The electrovalve 48 is thus closed and the pipe 30 is connected to the pipe 40 through the second passage of the valve 28. Since the path to the reservoir 12 through the valve 52 is blocked by the valve 52, and the path through the electrovalve 48 is closed because the solenoid 49 is energised by the anti-skid control device 64, the pressure in the pipe 40 can discharge only into the expansion chamber 44 and through the throttle 42 to the reservoir 12.

Figure 4:
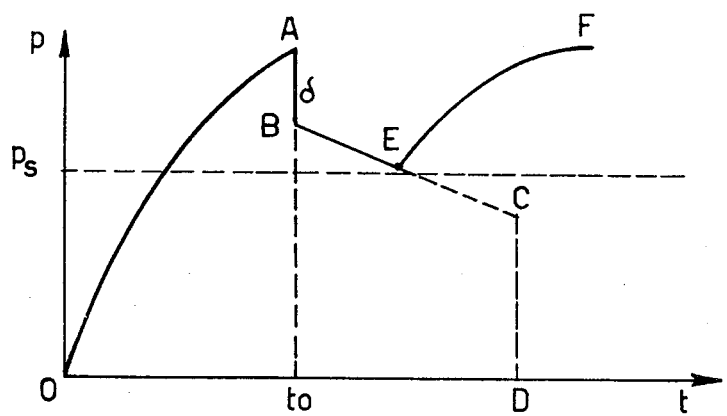
FIG. 4 is a diagram illustrating the variation of braking pressure with respect to time, in a second mode of operation of the anti-skid part of the braking system of FIG. 1.

Therefore, with reference to FIG. 4 where the point at which the solenoids 29, 49 are excited is indicated $t_o$, the braking pressure increases, as shown by the curve OA until the wheel 36 starts to slide and the anti-skid control device 64 operates. Then the pressure decreases quickly as shown by the section AB, by a decrement, until the expansion chamber 44 is filled. The discharge then continues through the throttle 42 to the reservoir 12, causing a gradual diminution of pressure as shown by the section BC.

Normally, at some point along the discharge curve ABC, the wheel 36 will no longer be in an incipient locking condition, the anti-skid control device will then de-energise the solenoids 28 and 49. When this occurs, shown for example at point E of FIG. 4, then the pipe 30 is reconnected to the pipe 18, and the braking pressure increases as shown by the curve EF to the pressure in the pipe 18 (assuming the brake pedal is still depressed). Simultaneously the expansion chamber 44 discharges rapidly into the reservoir 12 through the electrovalve 48 which opens when the solenoid 49 is de-energised and the circuit returns to its initial condition, in preparation for another anti-skid cycle of operation.

It can happen, however, in some abnormal conditions such as for example, in a case in which a vehicle travels from an area of high grip to an area of low grip while the anti-skid control device 64, is in operation, that the wheel 36 remains in an incipient sliding or locking condition despite the release of pressure down to point C of FIG. 4. In this case, as can be seen from the broken line of FIG. 4, the pressure continues to discharge beyond point E down to the point C through the throttle 42. Simultaneously the pressure in the control port 56 of the valve 52 is decreasing so that, at point C, the pressure at the control port 56 will have decreased below the threshold $P_S$, and the valve 52 will open again, thus allowing a rapid discharge to the reservoir 12 of the pressure in the pipe 40 and in the pipe 30 down to atmospheric pressure. This rapid decrease of pressure is shown by the section of the line CD.

It can be seen therefore that the valve 52 determines in which of the two possible different modes of operation the circuit will function on dry surfaces and on slippery surfaces.

The function of the electrovalve 48 is to allow rapid discharging of the expansion chamber 44 in the intervals when the anti-skid control device 64 is not in operation, so that at each new braking cycle, on a dry surface, whenever the pressure is discharged from the pipe 30 to the pipe 40 the expansion chamber 44 will be empty and thus the circuit will always achieve a rapid initial release of pressure.

Attention is particularly directed to Italian Patent application No. 67109–A/70 for a complete description of the advantages to be obtained from the method of operation of this circuit, that is the initial rapid release of pressure followed by a subsequent gradual discharge.

We claim:

1. An anti-skid braking system for at least one wheel of a vehicle, comprising a hydraulic fluid reservoir, a hydraulic pressure pump having an inlet and an outlet, said inlet communicating with said reservoir, a pressure operated brake, first conduit means connecting the outlet of said hydraulic pressure pump to said pressure operated brake, second conduit means communicating the outlet of said hydraulic pressure pump with said reservoir, normally open throttle valve disposed in said second conduit means, said normally open throttle valve being operatively connected with a brake pedal for selectively controlling said throttle valve to control the flow of fluid through said second conduit means, pressure discharge means connected in said first conduit means, said pressure discharge means including, means defining a first discharge path from said brake, a throttle in said first discharge path, an expansion chamber in said first discharge path, means defining a second discharge path in parallel with said first discharge path, a pressure controlled valve in said second discharge path, said pressure controlled valve having a control gate communicating with said pressure operated brake and responsive to the braking pressure to close said valve and block said second discharge path when the braking pressure exceeds a predetermined threshold value so that the only available discharge path to said reservoir is said first discharge path through said throttle, and an electronic anti-skid control device sensitive to the dynamic state of said wheel, said electronic anti-skid control device being operatively connected with said pressure discharge means to actuate said pressure discharge means during a wheel braking operation in response to the dynamic state of the wheel being braked to selectively release the braking pressure being applied to said pressure operated brake to prevent a vehicle skidding condition from arising.

2. The anti-skid braking system of claim 1, a normally open reset valve in parallel with said throttle between said expansion chamber and said reservoir, said reset valve being controlled by said anti-skid control device to close simultaneously with the actuation of said pressure discharge means.

3. The anti-skid braking system of claim 1 wherein there is provided an expansion chamber between said brake and said pressure discharge means.

4. The anti-skid braking system of claim 1 wherein said pressure discharge means include a valve comprising a piston slidable in a bore, means resiliently biasing said piston in one direction along said bore to a first position, a control port through which pressure is applied to move said piston in the other direction to a second position, an intermediate annular relieved portion on said piston, a pressure inlet to said bore, a pressure outlet from said bore, said intermediate annular relieved portion of said piston allowing communication between said inlet and said outlet when said piston is in said first positon, said piston moving to said second position to block said communication when the control pressure exceeds a predetermined threshold value.

5. The anti-skid braking system of claim 1 wherein said pressure discharge means include a valve comprising a piston slidable in a bore, means resiliently biasing said piston in one direction along said bore to a first position, a control port through which pressure is applied to move said piston in the other direction to a second position, a plunger on said piston, an outlet in the end of said bore, an inlet to said bore, said plunger cooperating with said outlet when said piston is in said second position, to block communication between said outlet port and said inlet to said bore, and allowing said communication when said piston is in said first position.

* * * * *